United States Patent [19]

Simmons

[11] Patent Number: 5,370,722

[45] Date of Patent: Dec. 6, 1994

[54] FILTERING ASSEMBLY FOR AIR INTAKE
[75] Inventor: Jesse K. Simmons, Livonia, Mich.
[73] Assignee: Air Solution Company, Livonia, Mich.
[21] Appl. No.: 160,688
[22] Filed: Nov. 30, 1993
[51] Int. Cl.5 ............................................. B01D 35/00
[52] U.S. Cl. ...................................... 55/351; 55/353; 55/354; 55/525; 160/35; 160/84.1 E
[58] Field of Search .................. 55/290, 294, 295, 302, 55/351, 353, 354, 525; 160/35, 84.1 E, 84.1 R; 261/4, 6, DIG. 11

[56] References Cited

U.S. PATENT DOCUMENTS

| | | |
|---|---|---|
| 2,103,892 | 12/1937 | Brown . |
| 2,118,474 | 5/1938 | Morton ....................... 160/84.1 E X |
| 3,298,672 | 1/1967 | Fordyce . |
| 3,487,620 | 1/1970 | Klein et al. ......................... 55/354 X |
| 3,695,008 | 10/1972 | Neumann ............................. 55/354 |
| 4,215,079 | 7/1980 | Christophersen et al. ....... 261/DIG. 11 X |
| 4,375,232 | 3/1983 | Heescher et al. .............. 160/84.1 E |
| 4,394,146 | 7/1983 | Klein ...................................... 55/354 |
| 4,485,342 | 9/1983 | Bergman .......................... 55/354 X |
| 5,097,885 | 3/1992 | Kitagawa ..................... 160/84.1 R |
| 5,116,490 | 5/1992 | Fontenot . |
| 5,179,989 | 1/1993 | Schon ........................ 160/84.1 E X |

Primary Examiner—Charles S. Bushey
Attorney, Agent, or Firm—Gifford, Groh, Sprinkle, Patmore and Anderson

[57] ABSTRACT

A filtering assembly for protecting an air intake of a structure. A flexible screen is mounted so as to cover an air intake opening of the structure. The screen may be selectively moved in either of opposite directions so as to be raised or lowered across the intake opening. The screen may further be stored at either or both ends of the structure.

15 Claims, 2 Drawing Sheets

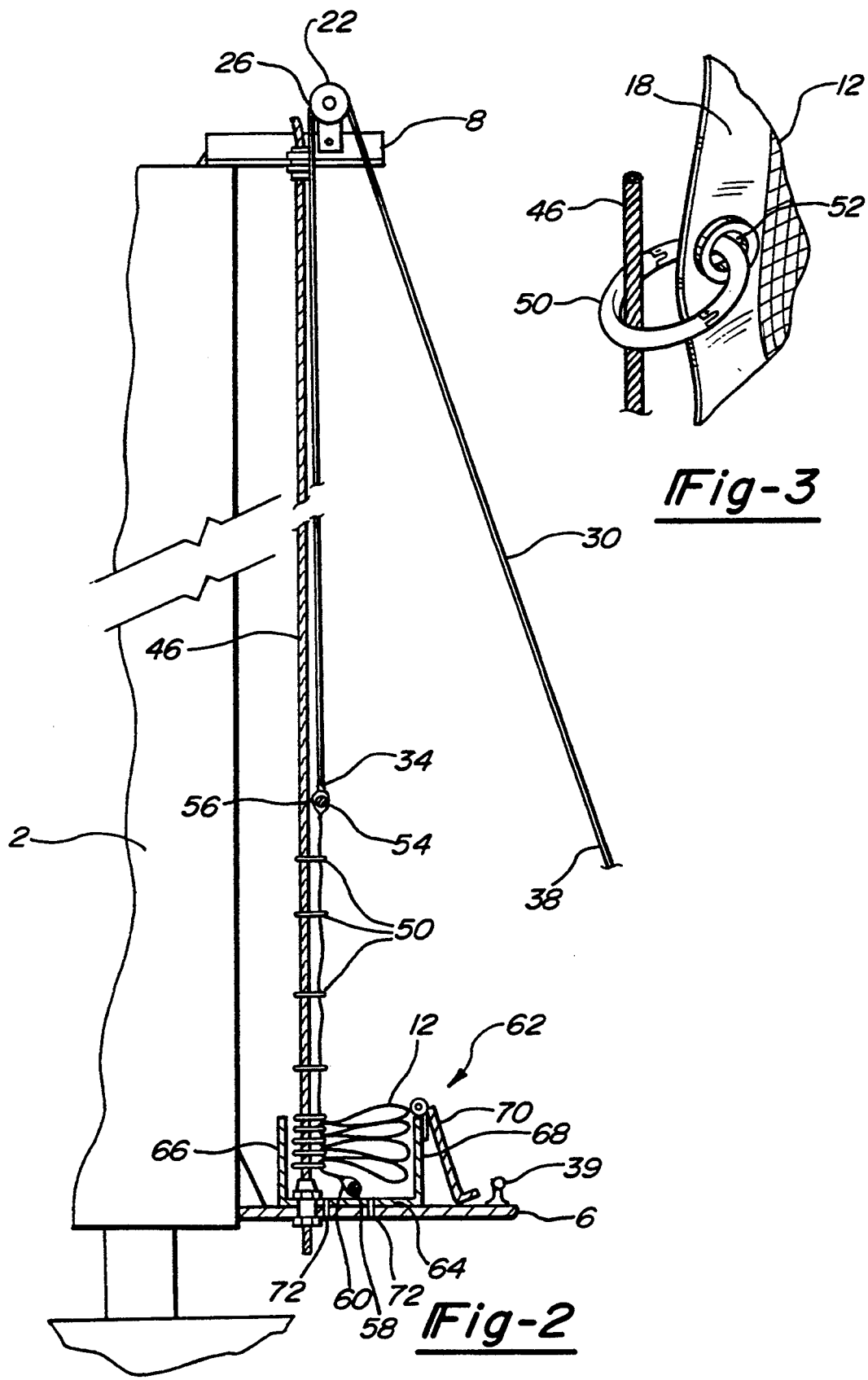

FILTERING ASSEMBLY FOR AIR INTAKE

BACKGROUND OF THE INVENTION

1. Field of the Invention

The present invention relates generally to filter assemblies and, more particularly, to a flexible filter screen for covering an air intake opening.

2. Description of the Prior Art

Filtration assemblies are known in the art which can be used in conventional cooling towers and like structures. Normally, such filter assemblies are used for filtering particles from a coolant flow within the cooling tower.

U.S. Pat. No. 3,298,672, issued to Fordyce and U.S. Pat. No. 5,116,490, issued to Fontenot, both teach filtration devices for removing particles from a stream of liquid coolant in a cooling tower.

However, neither the above references or the technology currently available in the art teaches an effective filter assembly for protecting the air intake of such structures. For example, a cooling tower normally requires sizable air intakes which are prone to collect insects, cottonwood and other particles and which can hinder their operation.

SUMMARY OF THE INVENTION

The present invention is a filtering assembly for protecting an air intake of a structure. A flexible screen is positioned to cover an opening of the air intake. The screen has a top, a bottom, a first side wall and a second side wall. A container is located at the base of the structure beneath the intake opening and stores the flexible screen when not in use.

In a first preferred embodiment, a pair of pulleys are employed to selectively raise and lower the flexible screen. Pull ropes engage within the pulleys, with each pull rope having a first end attached to the flexible screen and a second end which can be acted upon by the user to selectively raise and lower the screen. A pair of cables extend parallel to each other and are in proximity to the first and second sides of the screen. O-rings engage the cables and also engage eyelets formed along the edges of the sides of the screen so that the screen may be slidably guided during raising and lowering.

In a second preferred embodiment, a first container is attached to the structure positioned above the air intake opening and a second container is attached to the structure positioned below the air intake opening. The flexible screen is formed as a first cylindrical roll and a second cylindrical roll, the first cylindrical roll being placeable in the first container and the second cylindrical roll being placeable in the second container. An unrolled portion of the screen extends across the intake opening. A crank is selectively positioned on one or both of the containers and rotates both the cylindrical rolls to advance the screen across the intake opening.

BRIEF DESCRIPTION OF THE DRAWING

Reference will be made to the drawing in relation to the attached specification, wherein like reference numerals refer to like parts throughout the several views, and in which:

FIG. 2 is a side view of the embodiment shown in FIG. 1;

FIG. 3 is a sectional view of an O-ring for slidably securing the screen to one of the cables.

DESCRIPTION OF THE PREFERRED EMBODIMENT

Figure 1:
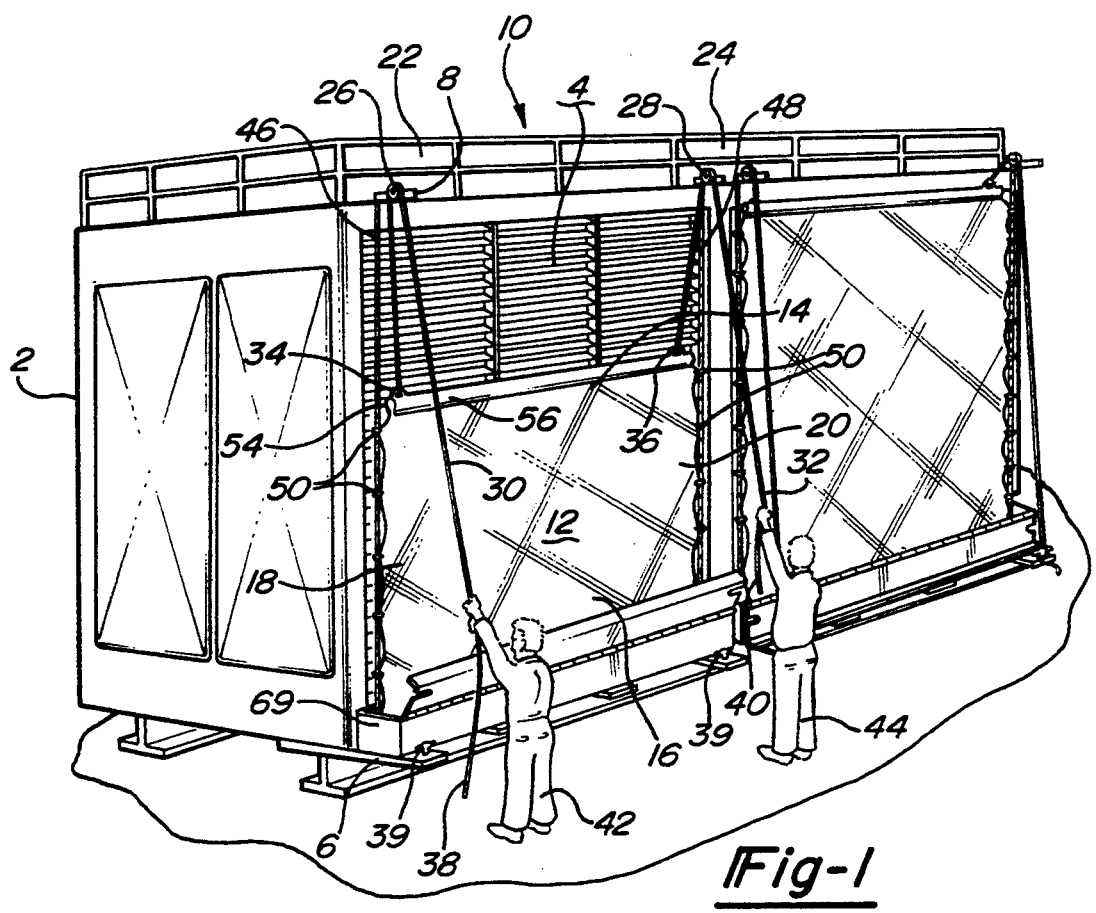
FIG. 1 is a perspective view of a first preferred embodiment of the filtering assembly of the present invention.

Referring to FIGS. 1–3, a first preferred embodiment of the filtering assembly 10 of the present invention for covering an air intake is shown. The filtering assembly is capable of being used with any air intake system, but is preferably used with cooling towers, building louvers, air handling units and the like. For illustration, a cooling tower structure 2 is shown having an intake opening 4.

A flexible screen 12 is provided as the filtering element for the filter assembly 10. The screen 12 is constructed of a lightweight screening material and is preferably a polyester or wire mesh material. The screen 12 is preferably rectangular having a top 14, a bottom 16, a first side 18 and a second side 20. The screen 12 is particularly useful for filtering out cotton wood pollen, insects, leaves and the like prior to their being drawn into the air intake 4 of the cooling tower 2 or like structure.

A first pulley assembly 22 and a second pulley assembly 24 are shown for selectively raising and lowering the screen 12. The first pulley assembly 22 consists of a first pulley 26 mounted to the structure of the cooling tower 2 above the intake opening 4 which is engaged by a first pull rope 30. The second pulley assembly 24 likewise has a second pulley 28 mounted to the structure 2 a predetermined distance away from the first pulley 26 and which is engaged by a second pull rope 32. The first pull rope 30 has a first end 34 connected to the top 14 of the screen 12 and a second end 38 which is acted upon by an operator 42 for moving the screen. Likewise, the second pull rope 32 has a first end 36 connected to the top 14 of the screen 12 a predetermined distance away from the first rope 30 and a second end 40 which is also acted upon by an operator 44 for moving the screen. The first and second pulley assemblies 22 and 24 can also be operated by a single user for selectively raising and lowering the screen 12. The second ends 38 and 40 of ropes 30 and 32 are each connected to a tie-down 39 once the screen is elevated to its desired position.

Referring again to FIGS. 1 and 3, a first cable 46 and a second cable 48 are attached to the cooling tower structure 2 and extend parallel to one another between the top and the bottom of the intake opening 4. Specifically, the cables 46 and 48 are attached at first ends to a bottom portion 6 of the structure 2 and at second ends to a top portion 8 of the structure 2. The cables 46 and 48 extend in close proximity and adjacent to the sides 18 and 20 of the flexible screen 12.

Pluralities of O-rings 50 surround the first and second cables 46 and 48. The O-rings are constructed of a durable lightweight metal or plastic and are capable of being opened and closed to encircle the cables 46 and 48. The O-rings 50 are also snappingly engaged within pluralities of eyelets 52 formed along the edges of the first side 18 and second side 20 of the screen 12. The eyelets 52 are constructed of metallic rings which surround holes formed in the sides 18 and 20 of the screen 12 and define annular spaces.

Referring again to FIG. 3, a sectional view is shown of a portion of the cable 46 and the manner in which the O-ring 50 engages the cable 46 and the eyelet 52 so as to slidably engage the screen 12 to the cables. As is clearly seen in FIG. 1, this arrangement is identical for both cables 46 and 48. Therefore, the cables 46 and 48 guide the screen 12 as the screen is drawn upwards or downwards across the air intake opening 4.

Further referring to FIGS. 1 and 2, a first rigid elongated member 54 is provided and is slidably inserted within a sleeve 56 at the top 14 of the screen 12. The member 54 provides stability to the screen 12 at its top edge 14, this being particularly important when the screen 12 is raised and lowered by the pulley assemblies 22 and 24. Referring again to FIG. 2, a second rigid elongated member 58 may also be inserted within a sleeve 60 at the bottom 16 of the screen 12. The second rigid member 58 also provides support to the screen 12 and stabilizes the screen at its bottom.

Referring again to FIGS. 1 and 2, a container 62 for storing the flexible screen 12 is secured to the cooling tower structure 2 at its lower portion 6. The container 62 has a bottom 64, a first side wall 66, a second side wall 68 and end walls 69 (see FIG. 1) which define an open interior. A lid 70 is hingedly attached to the second side wall 68 and can be selectively opened and closed to reveal the inside of the container 62. As can be seen from FIG. 1, the first and second cables 46 and 48 are secured to the lower portion 6 of the cooling tower structure within the defined interior of the container 62 to enable the screen 12 to be conveniently raised from or lowered within the container 62.

Accordingly, the screen 12 can be conveniently lowered and stored within the container 62 when it is desirable to gain access to the cooling tower intake 4. The screen 12 may further be conveniently disconnected from the pull ropes and pulleys when it is desired to clean or replace the screen 12. An additional screen, identical in all respects to screen 12, may also be kept in the container 62 and the pulley assemblies may be connected to the additional screen when it is desired to clean and/or replace the screen 12.

Referring again to FIG. 2, a plurality of apertures 72 are formed along the bottom 64 of the container 62. The apertures 72 are preferably located so as not to overlie the bottom portion 6 of the cooling tower structure 2. The apertures drain moisture from the container 62 which can accumulate on the screen 12 when the screen is in use.

Figure 4:
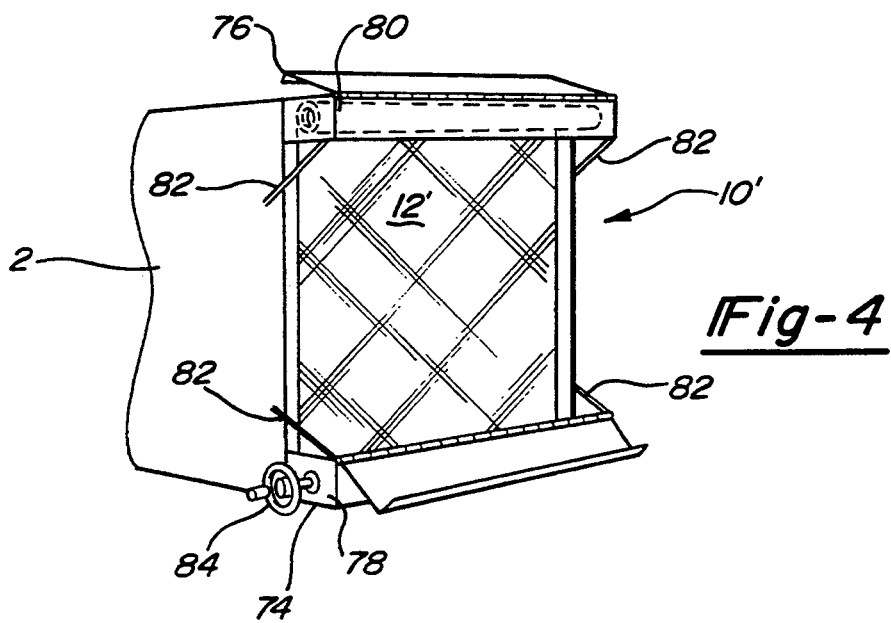
FIG. 4 is a perspective view of a second preferred embodiment of the filtering assembly of the present invention.

Referring further to FIG. 4, a second preferred embodiment of the filtering assembly 10' of the present invention is shown and provides a first container 74 located at a lower edge of the cooling tower structure 2. A second container 76, identical to the first container 74, is located at an upper edge of the cooling tower structure 2. As was previously described in reference to FIGS. 1-3, the air intake opening extends between the upper and lower edges of the cooling tower structure.

A flexible screen 12' is provided as a first cylindrical roll 78 and a second cylindrical roll 80. The first cylindrical roll 78 is positioned within the first container 74 and the second cylindrical roll 80 is positioned within the second container 76. An unrolled portion of the screen 12' extends between the cylindrical rolls 78 and 80 and covers the intake opening of the structure.

The first and second rolls are preferably mounted by pins or other structure known in the art (not shown) and are capable of freely rotating within the containers 74 and 76. The containers 74 and 76 are in turn mounted to the structure 2 by means similar to the portions 6 and 8 shown in FIGS. 1-3 or, alternatively, can be mounted by angled brackets 82 as is shown in FIG. 4.

A crank 84 is attached to either or both of the containers 74 and 76 and is capable of rotating the rolls 78 and 80. As is shown in FIG. 4, the crank 84 is attached to the first container 74. By turning the crank 84 in a counter-clockwise direction, the second roll 80 unrolls the screen 12' which is advanced across the intake opening in a downward direction and which is then accumulated on the first roll 78. In this fashion, portions of the screen 12' can be advanced across the intake opening at given intervals to ensure that the part of the screen 12' overlying the intake opening is always clean. Once the screen 12' is completely depleted, a new set of rolls can be replaced within the first and second containers.

Accordingly, the present invention provides a novel and unique assembly for protecting the air intake of any desired structure. Having described my invention, additional embodiments will become apparent to those skilled in the art to which it pertains. Specifically, the screen can be mounted so as to be advanced from side to side of the air intake opening, rather than from top to bottom as is shown in the drawings. Also, a plurality of screens can be used for covering a like plurality of intake openings arranged on a structure, such as is shown in FIG. 1. Finally, the screens can also be placed on the inside of an intake opening, rather that on the outside as is shown in the drawings.

I claim:

1. A filtering assembly for protecting an air intake of a structure, comprising:
   a flexible screen;
   means for advancing said flexible screen across an opening of the intake so as to cover the intake, said means comprising at least one pulley mounted to the structure adjacent to the air intake, said pulley receiving at least one pull rope with a first end of said pull rope connecting to said flexible screen and a second end of said pull rope being acted upon to advance said screen; and
   means for storing said screen attached to the structure.

2. The filtering assembly as described in claim 1, wherein said at least one pulley comprises a pair of pulleys arranged at opposite ends of the air intake and a pair of pull ropes for engaging said pulleys to advance said screen.

3. The filtering assembly as described in claim 2, wherein said flexible screen is of a generally rectangular shape having a top, a bottom, a first side and a second side, and further comprising a rigid elongated member connected to said top of said flexible screen, said pull ropes connecting to said rigid elongated member for advancing said screen across the intake opening.

4. The filtering assembly as described in claim 3, further comprising a first cable and a second cable extending parallel and adjacent to said first side and said second side of said flexible screen and means for slidably connecting said first and second sides of said screen to said first and second cables.

5. The filtering assembly as described in claim 4, said means for slidably connecting said first and second sides of said screen to said first and second cables comprising first and second pluralities of O-rings, said O-rings are engaged by said first and second cables and are also engaged within respective first and second pluralities of eyelets formed at the peripheries of said first and second sides.

6. The filtering assembly as described in claim 1, wherein said screen is constructed of a polyester material.

7. The filtering assembly as described in claim 1, wherein said screen is constructed of a wire mesh material.

8. The filtering assembly as described in claim 3, further comprising a second rigid elongated member connected to said bottom of said flexible screen.

9. The filtering assembly as described in claim 1, further comprising a tie-down connected to the structure for attaching said second end of said pull rope.

10. A filtering assembly for protecting an air intake of a structure, comprising:
a flexible screen;
means for advancing said flexible screen across an opening of the intake so as to cover the intake; and
means for storing said screen attached to the structure, said means for storing said screen comprising a container positioned at a base of the structure, said container having a bottom and a pair of side walls defining an open interior for receiving said screen and having a lid hingedly connected to one of said side walls.

11. The filtering assembly as described in claim 10, further comprising a pair of flexible screens stored within said container.

12. The filtering assembly as described in claim 10, further comprising a plurality of holes formed in said bottom of said container to drain moisture collecting within said container.

13. A filtering assembly for protecting an air intake of a structure, comprising:
a flexible screen;
means for advancing said flexible screen across an opening of the intake so as to cover the intake; and
means for storing said screen attached to the structure, said means for storing said screen comprising a first container positioned along one end of said intake opening and a second container positioned along an opposite end of said intake opening, each of said containers having a bottom and a pair of side walls defining an open interior and having a lid hingedly connecting to one of said side walls.

14. The filtering assembly as described in claim 13, said screen having a first end formed as a first cylindrical roll and a second end formed as a second cylindrical roll, said first cylindrical roll being positioned within said first container and said second cylindrical roll being positioned within said second container so as to cover said intake opening with said screen.

15. The filtering assembly as described in claim 14, further comprising a crank attachable to at least one of said first and second containers, said crank rotating said first and second cylindrical rolls to advance said flexible screen over said intake opening.

* * * * *